United States Patent Office 3,354,895
Patented Nov. 28, 1967

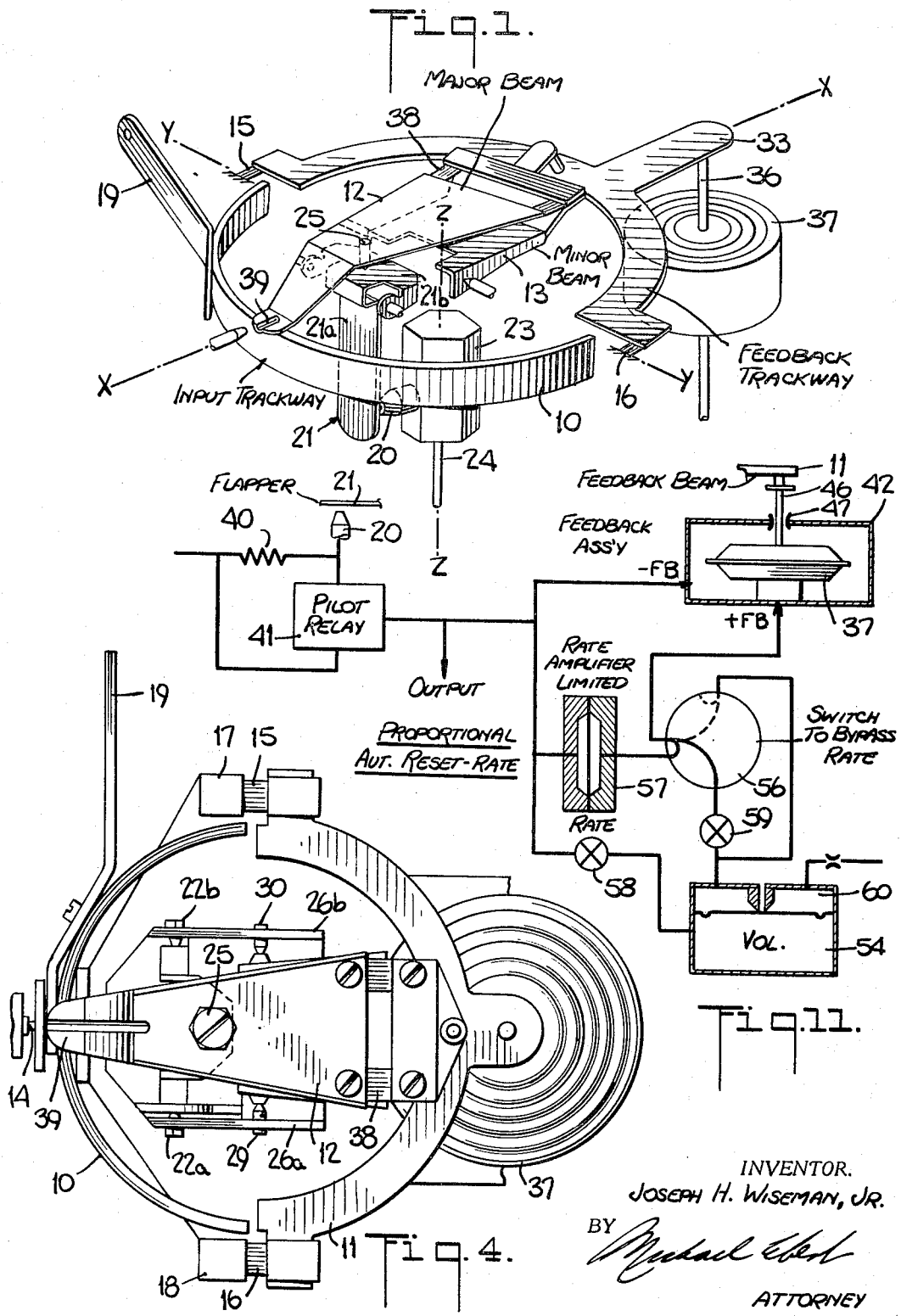

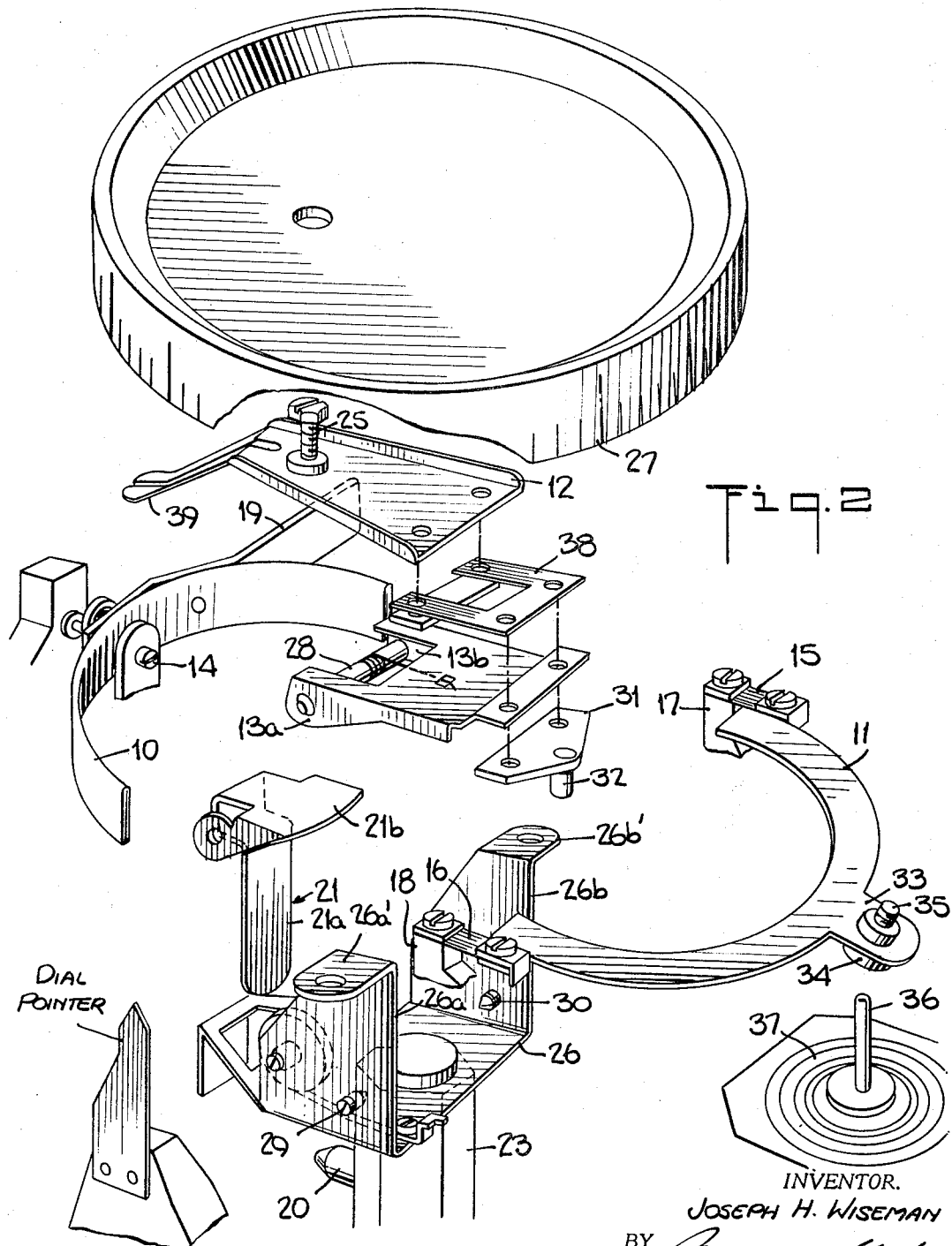

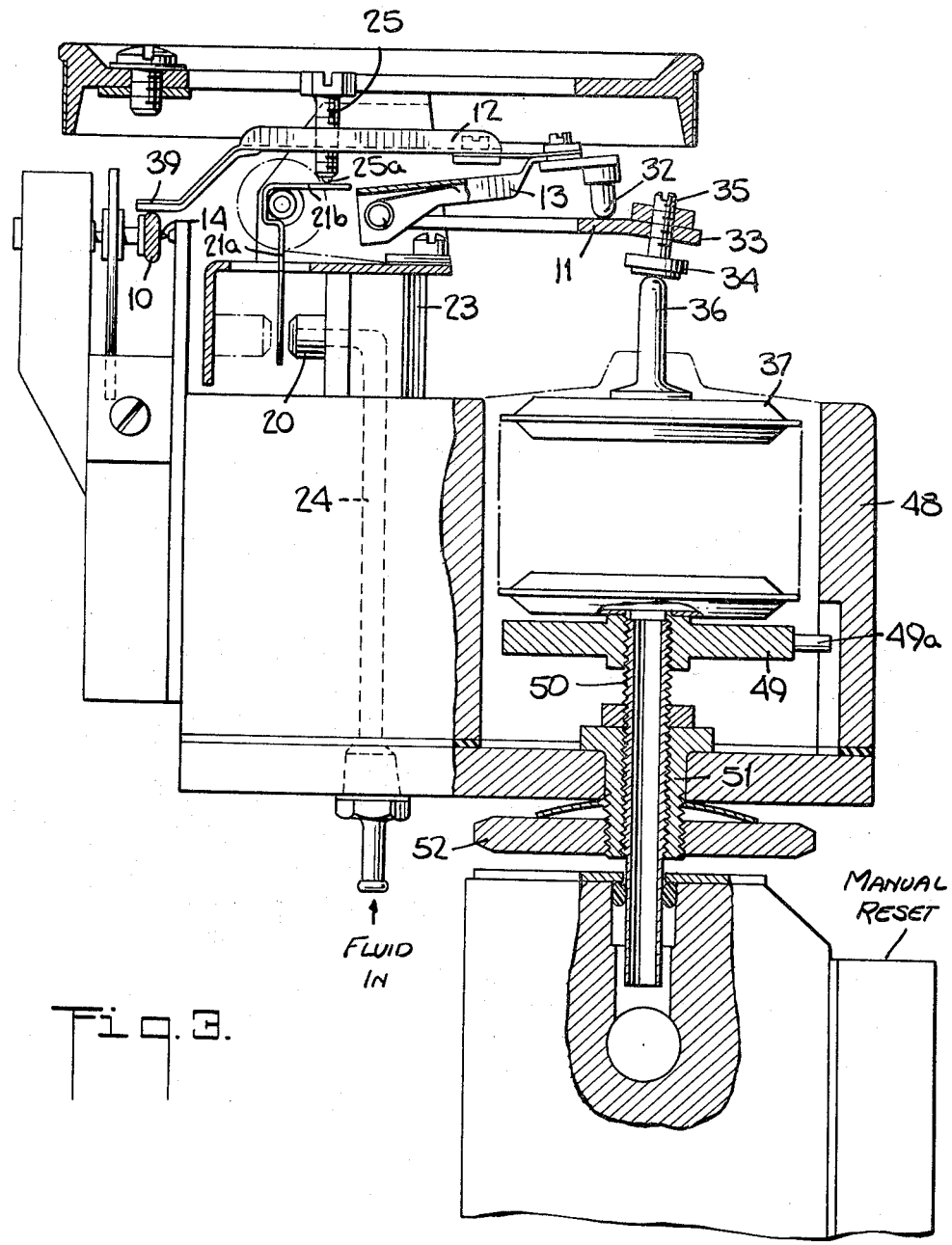

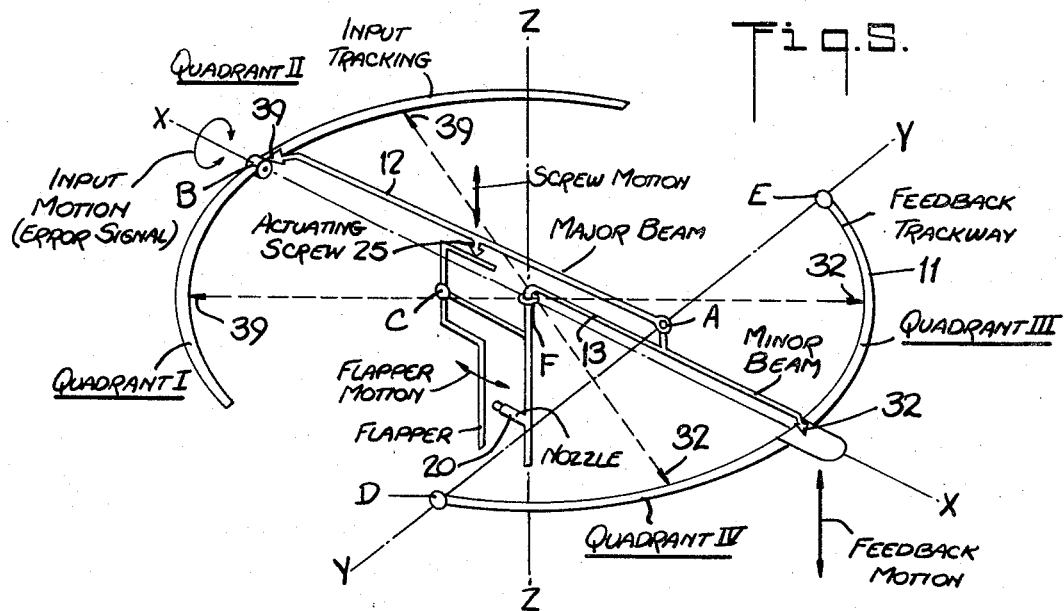
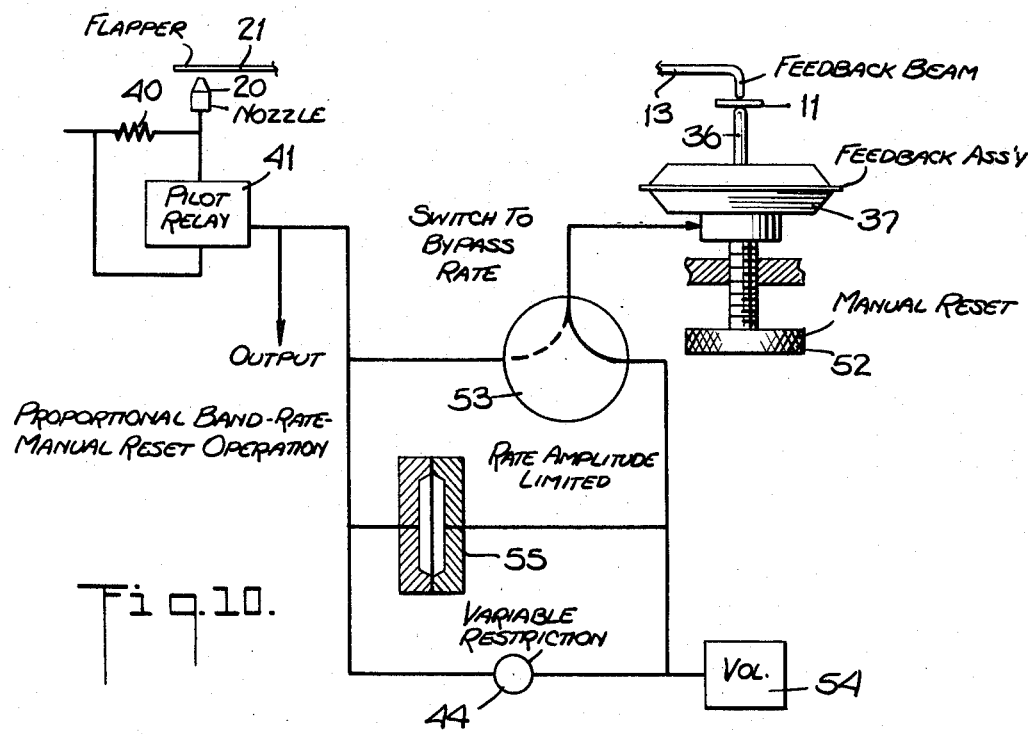

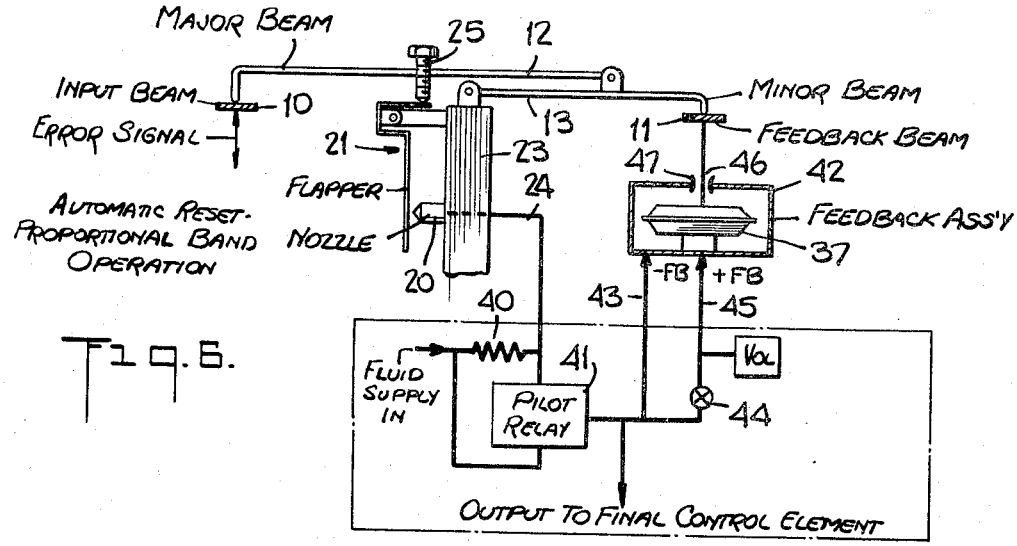
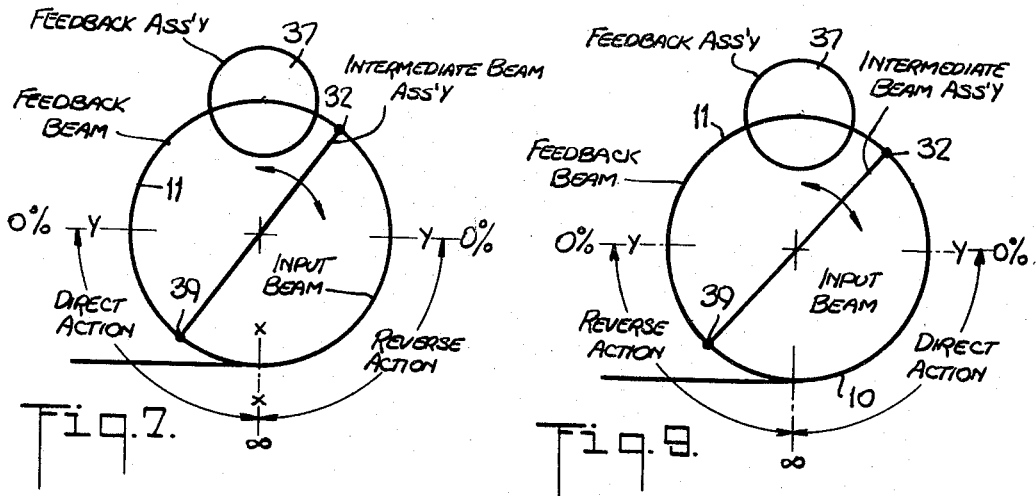
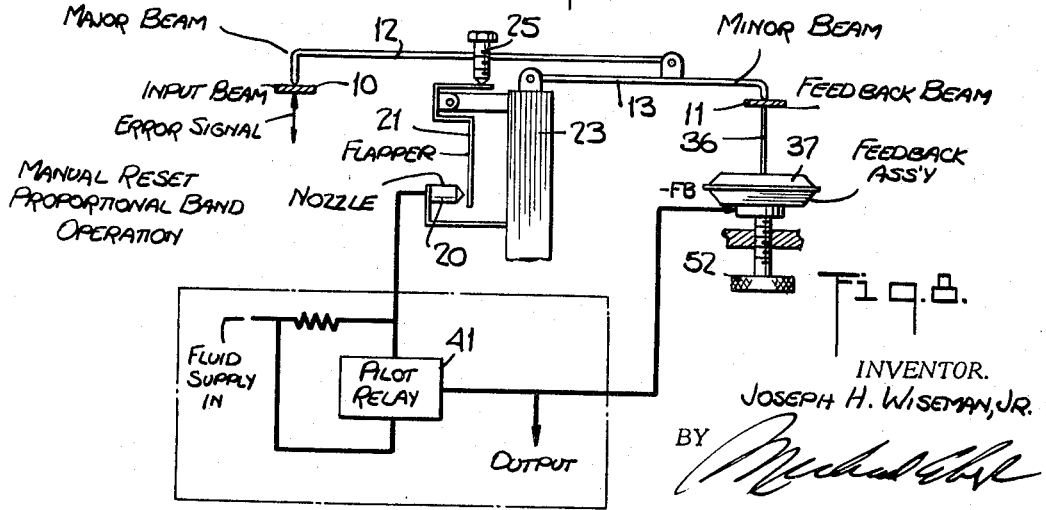

3,354,895
PNEUMATIC CONTROLLER
Joseph H. Wiseman, Jr., Holland, Pa., assignor to Fischer & Porter Co., Warminster, Pa., a corporation of Pennsylvania
Filed Dec. 14, 1965, Ser. No. 513,782
9 Claims. (Cl. 137—86)

This invention relates generally to pneumatic controllers responsive to an input motion to produce a change in fluid pressure which acts upon a a process variable to maintain it at a predetermined value, and more particularly to an improved proportional mechanism for such controllers.

A pneumatic controller is a component in a process control loop which is subject to disturbances, the controller acting in conjunction with other devices to maintain a process variable at a desired value. To accomplish this purpose, the pneumatic controller receives, in terms of motion, both the desired value or set point and the process variable, the controller functioning as a motion balance device to position a final control element which directly affects the process variable being controlled.

The variable controlled may be flow rate, temperature, pressure, humidity, liquid level, viscosity, or any other process variable. Thus the input motion of the controller may be obtained from a rate-of-flow meter or rotometer whose reading is translated into a mechanical motion which is applied to the input lever of the pneumatic controller.

The pneumatic output of the controller may be impressed upon a flow-regulating valve or damper, operated by a pneumatic motor, which valve or damper is opened or closed, or whose intermediate position is determined, by the pneumatic controller. It is also possible to operate final control elements in other forms, such as variable speed belt feeders. By "pneumatic controller" as used herein, is meant a fluid-operated controller, which fluid may be air or gas.

The primary object of the present invention is to provide a proportional mechanism of simple, efficient, rugged and compact design which is readily adjustable for a broad range of process conditions, and which may be easily dismantled for purposes of repair or adjustment.

Automatic controllers are generally classified by the types of control action or the modes of control they provide. The modes most commonly used in pneumatic controllers are proportional position, proportional plus reset, proportional plus rate, and proportional plus reset plus rate.

In the proportional-position mode, the actuating signal applied to the controller causes a change in output pressure proportional thereto. The degree of change in output pressure for a given change in actuating signal depends on the proportional band of the device. "Proportional band" is the range of the controlled variable which corresponds to the full operating range of the final control element. Reset action causes a change in output pressure proportional to the time integral of the actuating signal, whereas rate action causes the output pressure to vary as the rate of change of the actuating signal. Rate action is used in conjunction with proportional position and proportional plus reset actions.

A more specific object of the invention is to provide a pneumatic controller which is readily adaptable to the several modes of control action. A significant feature of the invention is that it includes a mechanism for obtaining a wide range of adjustable values of the proportional band, the mechanism being shiftable between direct and reverse action.

Briefly stated, these objects are attained in a pneumatic controller having a proportional mechanism which acts on an adjustable pneumatic element to govern the fluid pressure thereof as a function of an input error signal and of a feedback signal, the mechanism comprising two complementary semi-circular trackways, one trackway pivoting about a first axis passing through the midpoint thereof, the other of which pivots about a second axis perpendicular to the first axis.

A motion in accordance with an error signal is applied to the first trackway to effect a corresponding swing thereof about the first axis, and a motion in accordance with the feedback signal is applied to the second trackway to effect a corresponding swing thereof about the second axis. An intermediate beam assembly is mounted for rotation about a third axis mutually perpendicular to the first and second axes, the assembly including a minor beam one end of which pivoted, the other end riding on the feedback trackway whereby the minor beam is lifted or lowered on its pivot as a function of the feedback signal, and a major beam one end of which is pivoted at an intermediate point on said minor beam, the other end riding on the input trackway whereby the major beam is lifted or lowered on one end as a function of the feedback signal and on the other end as a function of the error signal whereby the motion of the major beam is the resultant of both signals, said major beam being operatively coupled to said pneumatic element to effect control thereof in accordance with its movement.

The mechanical advantage provided by the input trackway with respect to the major beam riding thereon depends on the position of this beam relative to the first axis, which is the fulcrum of this trackway, whereas the mechanical advantage provided by the feedback trackway with respect to the minor beam depends on the beam position relative to the second axis, which is the fulcrum of this trackway. The ratio of these mechanical advantages or gains is adjustable by rotating the intermediate beam assembly simultaneously to vary the angular position of the major and minor beams on the trackways.

For a better understanding of the invention, as well as other objects and further features thereof, reference is made to the following detailed description to be read in conjunction with the accompanying drawings, wherein:

FIG. 1 is a perspective view in somewhat schematic form showing the principal elements of a proportional mechanism in accordance with the invention;

FIG. 2 is an exploded view of the components forming an actual embodiment of the proportional mechanism;

FIG. 3 is an elevational view, partially in section, of the embodiment of the proportional mechanism shown in combination with a feedback element;

FIG. 4 is a plan view of the structure shown in FIG. 3, with the proportional band dial omitted;

FIG. 5 schematically illustrates the principles underlying the invention;

FIG. 6 is a schematic diagram of the proportional mechanism in combination with a pilot relay and feedback assembly in a system providing an automatic reset-proportional band operation;

FIG. 7 schematically shows the operation of the proportional mechanism in the system illustrated in FIG. 6;

FIG. 8 is a schematic diagram of the proportional mechanism in combination with a pilot relay and feedback assembly in a system providing the manual reset-proportional band operation;

FIG. 9 schematically illustrates the operation of the proportional mechanism in the system illustrated in FIG. 8;

FIG. 10 is a schematic diagram of a system including a pilot relay, a feedback assembly and a variable restriction valve, to effect proportional plus rate plus manual reset operation; and FIG. 11 schematically shows a controller system for proportional plus automatic reset plus rate operation.

Structure of proportional mechanism

Referring now to the drawings, and more particularly to FIGS. 1 to 4, the proportional band mechanism according to the invention comprises an input beam 10, adapted to act as an input trackway, a feedback beam 11 functioning as a feedback trackway, a major intermediate beam 12 which rides on input trackway 10, and a minor intermediate beam 13 which rides on feedback trackway 11, the two intermediate beams transmitting changes in motion to a flapper or nozzle assembly.

Input trackway 10 is formed of a metal strip curved into a semi-circular shape, this trackway being pivotally supported at its center in a single bearing 14, whereby the input trackway is rotatable about an axis X which also passes through the midpoint of the feedback trackway. Feedback trackway 11 is in the form of a semicircular plate which complements the input trackway to define a circle, its extremities being hinged by flat springs 15 and 16 to a pair of vertical standards 17 and 18 integral with a casting for supporting the mechanism, the feedback trackway pivoting about an axis Y at right angles to axis X.

Secured to input trackway 10 and extending therefrom is an input link or arm 19 which receives an error signal and serves to swing the trackway about axis X as a function of the polarity and magnitude of the signal. For the controller to function properly, it must be able to detect the difference between the actual process variable and the desired value or set point. The sensing means for the process variable depends on the nature of the variable and should, for example, this variable be flow rate, a flow meter would be appropriate for this purpose.

The difference between the actual process variable and the set point is known as the "input error signal." Its detection and conversion into a corresponding mechanical motion may be attained in various ways, as by an input linkage assembly, such as that disclosed in the "Instrument Bulletin 53P–4500 for Pneumatic Controllers," published by Fischer & Porter Co. of Warminster, Pennsylvania. The error-detection linkage forms no part of the present invention.

The pneumatic controller employs a displacement sensing device to translate small changes in physical displacement into related changes in fluid pressure. In the embodiment shown, this is effected by a flapper-nozzle assembly constituted by a nozzle 20 and a flapper element 21. Element 21 is pivotally mounted on trunnions 22a and 22b, whereby its blade portion 21a is movable toward or away from the orifice of nozzle 20. The flapper element is spring-loaded so that the blade is normally urged toward the nozzle. Nozzle 20 is mounted on and projects laterally from a vertical post 23, rotatably supported on the instrument casting, the nozzle being supplied with air or other fluid through a pipe 24 extending through the post and rotatable therewith.

In practice, the nozzle position relative to that of the flapper blade may be reversed so that a given signal which in one instance produces a reduction in clearance, in the other instance results in a like increase in clearance.

While a flapper-nozzle mechanism is disclosed as the pneumatic displacement-sensing device, it is to be understood that the proportional mechanism in accordance with the invention may be used with other forms of pneumatic sensing devices to translate the displacement produced in the mechanism to changes in fluid pressure.

The position of blade portion 21a of the flapper element relative to the nozzle 20 is controlled by an adjustable actuating screw 25 mounted on major beam 12 and projecting therebelow, the tip 25a of the screw engaging the surface of the lever portion 21b of the flapper, which lever portion is bent at right angles to the blade portion. Thus when the tip presses down on the lever portion, the blade portion is caused to swing. The extent to which the flapper swings with respect to the nozzle and the direction of the swing, depends on the up and down displacement of the screw, and this in turn is controlled by the movement of the major and minor intermediate beams 12 and 13 as a function of the error and feedback signals.

The flapper-nozzle assembly converts small changes in physical displacement imparted to the intermediate beams by the trackways to changes in air pressure by varying the resistance to air flow. This is accomplished by a regulated air supply which is fed through a restriction before emerging at the nozzle. Assuming an input error signal has so operated the proportioning mechanism as to decrease the gap between the flapper and nozzle, the resultant reduction in clearance acts to throttle the rate of air flow through the nozzle, thereby yielding an increase in back pressure in the nozzle air supply passage between the restriction and the nozzle. Reversing the input error has the opposite effect of increasing flapper-nozzle clearance, thus decreasing nozzle back pressure.

Post 23 rotates about an axis Z which is normal both to axes X and Y, whereby the three axes are mutually perpendicular. As best seen in FIGS. 2, 3 and 4, attached to the top of the post is a cradle 26 having a pair of upstanding brackets 26a and 26b, the upper ends of which are bent outwardly to form tabs 26a' and 26b' for supporting a circular proportional band dial 27 having suitable indicia inscribed circumferentially thereon. Thus by rotating the dial one may adjust the angular position of the intermediate beam assembly which is supported on the cradle 26.

Pivotally mounted between brackets 26a and 26b is minor beam 13, this being accomplished by means of a pin 28 which passes through openings in the arms 13a and 13b extending forwardly from one end of the minor beam. The opposing ends of pin 28 are engaged by bearing screws 29 and 30 passing through the brackets. Attached to the other end of minor beam 13 is a triangular plate 31 from whose apex a follower ball 32 projects downwardly to engage the surface of feedback trackway 11.

Feedback trackway 11 is provided with a lug 33 extending outwardly therefrom, which lug is aligned with axis X and lies at the midpoint of the semicircular feedback trackway. Secured to the underside of lug 33 is a button 34, the button being mounted on an adjusting screw 35. Button 34 is engaged by an actuating pin 36 projecting axially from a pressure-sensitive feedback capsule or bellows 37. As the bellows expands and contracts, the pin 36 pushes the feedback trackway up or down in accordance with the feedback signal.

Major beam 12 is pivotally mounted on the minor beam 13, this being accomplished by a U-shaped flat spring member 38 whose base is attached at a point adjacent the follower end of the minor beam and whose flexible arms are secured to the corresponding end of the major beam, such that the major beam, which carries the actuating screw 25, is hinged to the minor beam. Extending from the other end of the major beam is a follower arm 39 which rides along input trackway 10. Thus the movement of the major beam is a function of the input signal as imparted to the input trackway, and a function of the feedback signal, as imparted to the feedback trackway and transmitted through the minor beam.

Operation of proportional mechanism

Referring now to the equivalent diagram in FIG. 5, the various motions involved in the proportional mechanism will now be analyzed in detail to demonstrate how the device works. The pivot points are identified in this figure by letters. One end of the major beam 12 is pivoted by pivot A on the minor beam, the other end riding on input trackway 10 by means of follower 39. Input trackway 10 is pivoted centrally about pivot B, this trackway swinging about the axis X to a degree depending on the amount of error signal applied. The input trackway is divided into quadrants I and II on either side of the X axis. The feedback trackway, which is pivoted on pivots D and E and swings thereabout as a function of the feedback signal, is divided into quadrants III and IV.

When follower 39 is at the junction of quadrants I and II at axis X, rotation of the input trackway has no effect on the major beam, but when the follower is displaced in either direction from axis X, a lever action is produced in which the pivot B at the axis X serves as a fulcrum. The greater the distance between the follower 39 and pivot B, the greater the mechanical advantage obtained and the greater the effect on the major beam.

A clockwise rotation of the input trackway 10 causes the quadrant I portion to rise and quadrant portion II to fall. Thus if follower 39 of the major beam 12 lies in quadrant I, as shown in dash-lines, this will elevate the major beam to an extent which depends on two factors, the first of which is the magnitude of the input signal, and the second of which is the adjusted mechanical advantage, the second factor or gain being a function of the displacement of the follower 39 in the quadrant from the pivot B.

The elevation of the major beam raises actuating screw 25, causing the flapper to swing about its pivot C and to reduce the clearance with nozzle 20. Thus when follower 39 lies in quadrant I, an error signal causes flapper 21 to move toward the nozzle to an extent depending on the magnitude of the error signal at the set position of the follower 39 within the quadrant with the follower 39 in quadrant II, a reverse action to the same degree is obtained.

Feedback trackway 11 is pivoted about pivot points D and E lying on axis Y. The feedback motion is imparted to the trackway at its midpoint which represents the maximum displacement from the fulcrum D and E. A feedback signal causes the feedback trackway to swing about axis Y, thereby raising or lowering minor beam 13 on pivot F on axis Z to an extent depending on the feedback signal. But since the major beam is pivoted at point A on the minor beam, the raising or lowering of the minor beam acts to move the actuating screw 25 on the major beam with respect to the flapper lever portion 21b. When follower 32 on the minor beam approaches either pivot D or pivot E, there is a reduction in mechanical advantage, as a consequence of which, for a given feedback motion, the degree of minor-beam movement is diminished to an extent depending on how close the follower 32 is to either of pivot points D or E.

When, therefore, the proportional mechanism is used in a feedback loop, the error signal produces a change in the flapper-nozzle clearance, this resulting in a process change which is reflected in the feedback assembly to produce a correction in the flapper-nozzle clearance to rebalance the flapper-nozzle relationship at the desired process value.

Proportional band adjustment is obtained by changing the ratio of movement of the error-sensitive input mechanism to that of the feedback-sensitive mechanism. Inasmuch as the major and minor beams are rotatable about axis Z, it will be evident that a clockwise rotation from the X-axis position will simultaneously cause follower 39 to enter quadrant II to increase the gain of the input mechanism and to cause follower 32 to enter quadrant IV to correspondingly decrease the gain of the feedback mechanism. The amount of change depends on the deviation of the two followers from the X axis. Reversal is obtained by moving the major and minor beams counter-clockwise into the quadrants I and III. Thus the ratio of the input and feedback elements may be varied by rotating the proportional dial.

The proportional band can therefore be varied from zero to maximum in both direct and reverse action control. Direct action occurs when an increase in process variable produces an output increase. The error signal to the controller is equal to the process variable minus the set point, and is positive when the process variable increases.

Controller action with automatic reset

Referring now to FIGS. 6 and 7, there is shown the arrangement used with the proportional controller to obtain automatic reset. Supply fluid is fed through a fixed restriction 40 into the flapper-nozzle element through line 24 and into a pilot relay 41 which responds to the back pressure developed in the flapper-nozzle element.

The feedback capsule or bellows 37 is contained in a housing 42, the output pilot relay 41 being fed through line 43 into housing 42 to subject the exterior of the bellows 37 to pressure. This same output is fed through a needle valve 44 acting as a variable restriction and through a line 45 into the interior of the bellows 37. The motion of the pressure-sensitive bellows 37 is transmitted to the feedback beam 11 by a shaft 46 connected at one end to the bellows and passing through a slide bearing 47 installed on the top of the housing.

Thus the fluid pressure from the pilot relay, which is imposed on the exterior of the pressure-sensitive bellows to contract same, acts as a negative feedback force, whereas that applied internally to the bellows and acting to expand same, constitutes a positive feedback force whereon the variable restriction 44 serves to set the reset time.

The relationship of bearing 47 to shaft 46 is such as to permit a deliberate bleed rather than an air-tight seal. This has the effect of reducing the area of the exterior of bellows 37 by the area of shaft 46. Inasmuch as the effective internal area of the bellows is thereby slightly larger than that of the exterior, as output pressure from the pilot valve increases, there will be a net upward motion or positive feedback gain, known as "integration gain." The size of shaft 46 is designed to afford optimum integration gain for the controller.

Thus in operation, the error signal, which represents a deviation of the process variable from the desired set point, acts upon the input trackway which controls the major beam to produce through the flapper-nozzle element a change in fluid pressure. This change is detected in the pilot relay and controls the feedback bellows assembly which acts upon the feedback trackway and the minor beam to bring about a change in the position of the major beam. This in turn gives rise to an adjustment in fluid pressure which acts upon the pilot valve to produce an output change which is applied to the final control element to restore the variable being controlled to its set value.

Manual reset

With manual reset, no pressure is applied to the exterior of the bellows 37 for there is no automatic reset. The manner in which manual reset is accomplished is shown in FIG. 3, wherein bellows 37 is contained within a chamber 48 formed within the casting of the instrument. The upper end of the bellows is connected to one end of pin 36, whose other end engages button 34 for varying the position of feedback trackway 11.

The lower end of the bellows rests on an elevator disc 49 mounted at the end of an externally threaded hollow rod 50 which projects through an internally threaded bushing 51 in the bottom of the chamber. Disc 49 is free to move axially, but its rotation and that of the rod 50 secured thereto is prevented by a tongue extension 49a. By rotating wheel 52 secured on the end of bushing 51 exterior to chamber 48, the disc 49 and the bellows thereon is caused to move up or down within the chamber, depending on the direction of wheel rotation.

The proportional action with manual reset is shown in FIGS. 8 and 9. Since the feedback pressure is reversed, that is, the output of pilot relay 41 is applied internally to bellows 37 instead of outside (negative feedback), the nozzle 20 position relative to that of the flapper is also reversed, as shown in FIG. 8 and as shown in dash-lines in FIG. 3. This arrangement is used when operating in the proportional plus manual reset mode and in the proportional plus rate plus manual reset mode. The arrangement where the pressure goes both inside and outside of the bellows, as described in the previous section, is used for proportional plus automatic reset operation, and proportional plus automatic reset plus rate operation.

*Proportional plus rate plus manual reset*

In FIG. 10, there is shown a proportional plus rate plus manual reset controller operation. A switch 53 is provided which in one position (dotted lines) switches the output of the pilot relay 41 into the proportional and manual reset controller arrangement equivalent to that shown in FIG. 7, the entire rate section of the controller being eliminated. By turning switch 53 to the other position (solid lines), the output of pilot relay 41 is fed through variable needle valve 44 and a rate section is introduced. This needle-valve controls the variable restriction or the various rate times. The volume container 54 shown, sizes the capacitance of this system, and the diaphragm assembly 55 shunted across the variable restriction makes the controller a compensated proportional plus rate action, and controls the rate amplitude.

*Proportional plus automatic reset plus rate*

In the proportional plus reset plus rate arrangement shown in FIG. 11, the two-position switch 56 serves to eliminate rate action if such is desired, thus making the controller a proportional plus reset controller. A diaphragm assembly 57 affords compensated proportional plus rate action and determines the rate amplitude. Variable restrictions are provided by two needle valves 58 and 59. For sizing purposes, because of the two valves entailed, one for reset and one for rate, a 1—1 relay 60 is used. Since the nozzle in the 1—1 relay is vented to atmosphere, this has the effect of producing an infinite volume, thus minimizing the sizing of the volume in the rate section. Also in this three-mode controller, it is to be noted that the negative feedback, that is, the output coming directly from pilot valve 41 and going directly into the housing 42, to act externally on the bellows therein, is unrestricted. All restrictions are disposed in the positive feedback system.

While there has been shown and described a preferred embodiment of pneumatic controller in accordance with the invention, it will be appreciated that many changes and modifications may be made therein without, however, departing from the essential spirit of the invention as defined in the annexed claims.

What I claim is:

1. A pneumatic controller for adjusting the position of a flapper relative to a nozzle to convert changes in motion to changes in fluid pressure, said controller comprising:
    (A) a semicircular input trackway rotatable about a first axis passing through the center thereof,
    (B) means to apply an error signal to said input trackway to cause a rotation thereof about said first axis as a function of said signal,
    (C) a semicircular feedback trackway pivoted at its end for movement with reference to a second axis perpendicular to said first axis,
    (D) means to apply a feedback signal to said feedback trackway to effect movement thereof with respect to said second axis, and
    (E) an intermediate beam assembly mounted for rotation about a third axis mutually perpendicular to the first and second axes, said assembly including:
        (a) a minor beam pivoted at one end, the other end of which rides on said feedback trackway whereby said minor beam is raised or lowered in accordance with the movement of said feedback trackway,
        (b) a major beam one end of which is pivoted at a point on said minor beam, the other end of which rides on said input trackway whereby said major beam is raised or lowered on one end in accordance with movement of said minor beam and in the other end in accordance with the movement of said input trackway, and
        (c) actuator means on said major beam in operative engagement with said flapper to cause it to shift relative to said nozzle in accordance with the movement of said major beam.

2. A controller as set forth in claim 1, wherein said intermediate beam assembly is mounted on a rotatable post, said nozzle being mounted laterally thereon and supplied with fluid through a line passing through said post.

3. A controller as set forth in claim 2, wherein said flapper includes a blade portion in operative relation to said nozzle and a lever portion operatively engaged by said actuator means.

4. A controller as set forth in claim 3, wherein said actuating means is in the form of an adjustable screw mounted on said major beam.

5. A controller as set forth in claim 1, wherein said major and minor beams have follower elements lying in a common axis whereby as the beams are rotated about the third axis, the follower elements are correspondingly displaced with respect to said first axis to provide a change in ratio for proportional band control.

6. A controller as set forth in claim 5, further including a proportional band dial secured to the intermediate beam assembly and rotatable therewith.

7. A controller as set forth in claim 1, wherein said feedback signal is applied to said feedback trackway at the midpoint therein which is aligned with said first axis.

8. A pneumatic controller provided with a proportional mechanism which acts on an adjustable pneumatic element to govern fluid pressure, said mechanism comprising two complementary semi-circular trackways, one of which pivots about a first axis passing through the midpoints of both trackways, the other pivoting about a second axis perpendicular to the first axis, said first trackway being responsive to an input error signal whereby the swing thereof about the first axis is proportional to said error signal, said second trackway being responsive to a feedback signal whereby the swing thereof about said second axis is proportional to said feedback signal, and an intermediate beam assembly mounted for rotation about a third axis mutually perpendicular to the first and second axes, said assembly including a minor beam pivoted at one end, the other end thereof riding on the feedback trackway whereby the movement of said minor beam is a function of said feedback signal, a major beam pivoted at one end to a point on said minor beam, the other end thereof riding on the input trackway whereby the movement of said major beam is a function both of said input signal and said feedback signal, said major beam being operatively coupled to said pneumatic element to control the pressure thereof in accordance with its movement.

9. A controller as set forth in claim 8, wherein said pneumatic element is a flapper-nozzle device.

References Cited

UNITED STATES PATENTS 3,095,003   6/1963   Dyson _____ 137—86

ALAN COHAN, *Primary Examiner.*